United States Patent
Diehl et al.

(10) Patent No.: US 9,541,206 B2
(45) Date of Patent: Jan. 10, 2017

(54) SHEET METAL EXHAUST BYPASS VALVE (71) Applicant: HALLA VISTEON CLIMATE CONTROL CORP., Daejeon (KR)

(72) Inventors: Peter Diehl, Köln (DE); Michael Gauss, Köln (DE); Andreas Capelle, Pulheim (DE); Oliver Fischer, Aachen (DE); Jürgen Nothbaum, Aachen (DE)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/091,406

(22) Filed: Nov. 27, 2013

(65) Prior Publication Data

US 2014/0144127 A1    May 29, 2014

(30) Foreign Application Priority Data

Nov. 27, 2012   (DE) .................. 10 2012 111 464

(51) Int. Cl.
*F16K 11/052*    (2006.01)
*F16K 11/074*    (2006.01)

(52) U.S. Cl.
CPC ............ *F16K 11/074* (2013.01); *F16K 11/052* (2013.01); *Y10T 137/87812* (2015.04)

(58) Field of Classification Search
CPC .. F01N 13/087; F01N 2240/36; F16K 1/2021; F16K 1/2028; F16K 1/2035; F16K 1/2057; F16K 11/052; F16K 11/074; F16K 27/0227; F16K 11/0525; F02M 25/0796

See application file for complete search history.

(56) References Cited

U.S. PATENT DOCUMENTS

| 1,471,078 | A | * | 10/1923 | Vogt | .............. F01N 13/087 251/303 |
| 1,480,070 | A | | 1/1924 | Hoving | |
| 2,035,747 | A | * | 3/1936 | Harris | ............. 137/625.44 |
| 4,718,457 | A | | 1/1988 | Luger | |
| 5,265,547 | A | * | 11/1993 | Daws | ............. A01C 7/087 111/175 |

(Continued)

FOREIGN PATENT DOCUMENTS

DE  8428721 U1  1/1985
DE  8525184 U1  10/1985

(Continued)

OTHER PUBLICATIONS

Machine translation of JP 2010-138780 A accessed on Mar. 20, 2015.*

(Continued)

*Primary Examiner* — Jonathan Matthias
(74) *Attorney, Agent, or Firm* — Fraser Clemens; Martin & Miller LLC; James D. Miller (57) ABSTRACT

The invention relates to a bypass valve, particularly a two-way valve for exhaust gas flows from motor vehicles, having a valve housing and an actuating mechanism with a valve flap and two ports for fluid outlet, which are embodied as alternately sealable by the valve flap, and one port for fluid intake, characterized in that at each of the ports for fluid outlet an adapter and sealing ring is provided, arranged at least partially and fluid-tight in the valve housing, wherein the valve flap can be positioned fluid-tight on the adapter and sealing ring.

18 Claims, 5 Drawing Sheets

(56) References Cited

U.S. PATENT DOCUMENTS 5,908,047 A * 6/1999 Nakamura .............. F01N 3/027
137/625.44

FOREIGN PATENT DOCUMENTS

| | | |
|---|---|---|
| DE | 9003542 U1 | 5/1990 |
| DE | EP 1493951 A2 * | 1/2005 ............. F01N 1/166 |
| DE | 10339623 A1 | 3/2005 |
| FR | 2036130 A5 | 12/1970 |
| FR | 2908492 A1 | 5/2008 |
| FR | 2917801 A1 | 12/2008 |
| JP | 4-110270 U | 9/1992 |
| JP | H10121996 A | 5/1998 |
| JP | 2010138780 A | 6/2010 |
| JP | 2012140983 A | 7/2012 |

OTHER PUBLICATIONS

Machine translation of DE 10339623 A1 accessed on Mar. 20, 2015.*
Machine translation of EP 1493951 A2, accessed on Oct. 26, 2015.*

* cited by examiner

SHEET METAL EXHAUST BYPASS VALVE

CROSS-REFERENCE TO RELATED APPLICATION

This application claims priority to German Patent Application Serial No. DE 10 2012 111 464.1 filed Nov. 27, 2012, hereby incorporated herein by reference in its entirety.

FIELD OF THE INVENTION

The invention relates to a bypass valve, particularly a bypass damper, as a two-way valve for exhaust gas flows from motor vehicles.

BACKGROUND OF THE INVENTION

Generic valves of this type comprise a housing and an actuating mechanism for the closure element, for example a valve flap. Such valves further comprise a port for fluid intake and two ports for fluid outlet, and are used, for example, as bypass valves for directing the exhaust gas flow from motor vehicles into different fluid routes, based upon requirements.

One example of a use for said generic valves is for either conducting the flow of exhaust gas to the exhaust gas heat exchanger in gasoline and/or diesel engines for the purpose of reducing harmful emissions from diesel engines, increasing the efficiency of gasoline engines, or conducting the exhaust gas flow via a bypass for energy input into the engine coolant in diesel and gasoline engines and in hybrid vehicles.

In the prior art, valves of this type are known in practical implementation as bypass dampers, and are constructed with a cast steel or cast aluminum housing or a stamped sheet metal housing, with a fixedly mounted flap.

In valves in which the valve housing is embodied as a cast component, it is a particular disadvantage that these valves are quite heavy. Moreover, the cost of producing said valves is high, due, among other things, to the correspondingly high cost of tools and expensive individual components.

Cast housings have the further disadvantage of offering poor accessibility to the interior of the valve housing for performing work on the housing.

The stated disadvantages of cast housings have been acknowledged and even overcome in the prior art to some extent by an exhaust gas valve according to German Pat. Appl. Pub. No. DE 103 39 623 A1. German Pat. Appl. Pub. No. DE 103 39 623 A1 discloses a valve which has a sheet metal valve housing. The sheet metal valve housing is embodied as a funnel-shaped or pot-shaped deep-drawn sheet metal part having a housing opening at the narrower end and a larger housing opening at the wider end. The special feature of this design is the separate flange plates mounted at the ports and covering the housing openings, which plates have defined openings and connection options along with separately machinable sealing surfaces for the valve flaps.

Disadvantages of the prior art include, for one, the costly use of cast housings having a complex level of machining, and for another, in the case of bypass dampers having a stamped housing, and problems with internal leakage due to a lack of flexibility of the flap, which impacts the cooling capacity of the exhaust gas heat exchanger.

SUMMARY OF THE INVENTION

The object of the invention is therefore to further simplify the construction of a bypass valve having a sheet metal valve housing, allowing it to be produced more cost-effectively.

A further object of the invention is to achieve easy adaptability of bypass valves to various conditions of use and various flaps, and to achieve an installation- and repair-friendly configuration.

The object is attained by the features of claim 1. Further improvements are specified in the dependent claims.

More particularly, the object of the invention is attained with a bypass valve configured as a two-way valve for exhaust gas flows from motor vehicles and consisting of a valve housing and an actuating mechanism having a valve flap and two fluid outlet ports, designed to be alternately sealable by means of the valve flap, and one port for fluid intake.

At each of the fluid outlet ports, an adapter and sealing ring is arranged at least partially in the valve housing in a fluid-tight manner, wherein the valve flap can be positioned on the adapter and sealing ring in a fluid-tight manner.

According to an embodiment of the invention, the adapter and sealing ring to is embodied as a hollow cylinder, and to is positioned at the fluid outlet ports, projecting outward at said ports in terms of its height. The tubes attached at the port are therefore routed through the projecting adapter and sealing ring, while at the same time, the port is sealed against the exterior, since the hollow cylinder is received and encompassed both by the valve housing and by the tubes connected thereto.

According to another embodiment of the invention, the adapter and sealing ring is designed to be adaptable to the geometry of the valve flaps by adjusting the thickness of the hollow cylinder jacket and by the selection of materials. The adapter and sealing ring may be made of 1.4306 stainless steel.

According to a further embodiment of the invention, the flow cross-section of the fluid outlet ports can likewise be adjusted by adjusting the thickness of the hollow cylinder jacket of the adapter and sealing ring. This results in a dual adjustability with respect to the sealing function between valve flap and adapter and sealing ring, and with respect to the flow cross-section through the adapter and sealing ring.

The actuating mechanism with the valve flap is preferably formed by a spindle mounted unsupported in the valve housing, forming a tight seal.

The valve housing is preferably composed of a lower valve housing half and an upper valve housing half and is embodied as a sheet-metal housing.

According to yet another embodiment of the invention, the lower and upper valve housing halves are embodied as symmetrically and compatibly connectable, resulting in a decrease in production costs and a facilitation of replacement in the event of a repair.

According to an embodiment of the invention, the valve flap is embodied as a single flap; alternatively, the valve flap can be embodied as a double flap, depending on design conditions.

When a single flap is used, the adapter and sealing ring must be adapted to the shape of the flap bracket on one side, in order to ensure that a seal will form. This can result in undesirable leakage in the adapted area, and also necessitates additional machining of one of the two adapter and sealing rings. The single flap can be used in exhaust gas recycling systems (AGR systems) only if the leakage, which necessarily occurs, does not result in a loss of efficiency of the cooler or in increased temperatures in the bypass mode when the requirements according to specifications are exceeded.

If an improvement in leakage is necessary in order to achieve the values according to specifications, the use of a double valve flap is expedient. With this flap construction, both gas routes are sealed nearly free from leakage. However, the embodiment of the valve flap as a double flap requires more installation space, since the flap is not as compact as a single flap.

Another embodiment of the invention involves a gimbal mounting of the valve flap with respect to the flap bracket to ensure a sealed abutment of said flap against the adapter and sealing ring, with the flap bracket being arranged on the spindle, and fixedly connected thereto, for the purpose of transferring the adjusting movement to the valve flaps.

In general, the concept of an embodiment of the invention is considered to involve providing adapter and sealing rings which can be flexibly adapted and configured and which are connected to the valve housing at the fluid outlet ports of the bypass valve, forming a fluid-tight seal. The flow of fluid therefore flows through the fluid outlet only in the interior of the hollow cylindrical adapter and sealing ring. Furthermore, the adapter and sealing ring cooperates efficiently with the rotatable valve flap and optionally results in a blocking and sealing effect for each flow route.

With a symmetrical stamped sheet-metal housing in two parts having a flap door which is mounted unsupported and which is sealed internally as described, hot engine exhaust gases can be conducted into two separate exhaust gas flow routes.

In yet another embodiment of the invention, the bypass valve is highly compact and therefore, a savings of installation space is achieved, and that furthermore, a savings in terms of weight can be achieved as compared with cast valves. A reduction in cost achieved by the use of sheet metal half shells as the upper and lower valve housing halves is particularly advantageous.

Tolerance values that cannot be avoided entirely according to the method using stamped sheet metal components can be compensated for by the adapter and sealing ring, and therefore, an optimal sealing function can also be achieved using valve housings produced according to this method. Thus, a valve flap can be installed by means of an unsupported mounting. With this construction, flaps that are traditionally rigidly connected to the shaft or the spindle can be used, since the relatively high tolerance values and the resulting leakages and undesirable gas leakage rates can be compensated for by means of the adapter and sealing ring.

DESCRIPTION OF THE DRAWINGS

Additional details, features and advantages of embodiments of the invention are described in the following description of examples of variants, with reference to the attached set of drawings. The drawings show.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
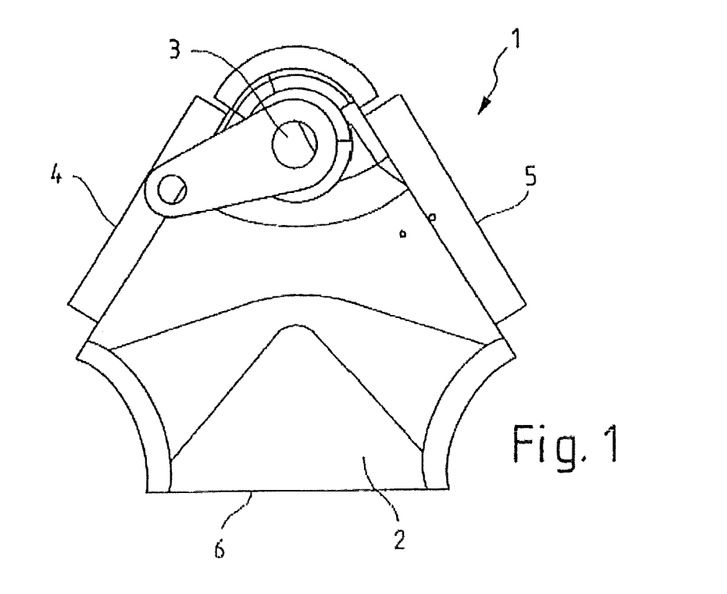
FIG. 1: a plan view of a bypass valve.

FIG. 1 shows a bypass valve 1 in the embodiment as a two-way valve for controlling exhaust gas flows, from a plan view. The bypass valve 1 in this case consists substantially of a valve housing 2 and an actuating mechanism 3 as the means for directing the fluid flow. The bypass valve 1 has three ports, a bypass port 4, a cooler port 5, and an exhaust gas port 6, wherein fluid intake occurs at the exhaust gas port 6. The exhaust gas is directed or divided to the fluid outlets, the bypass port 4 and/or the cooler port 5 by means of the actuating mechanism 3.

Figure 2:
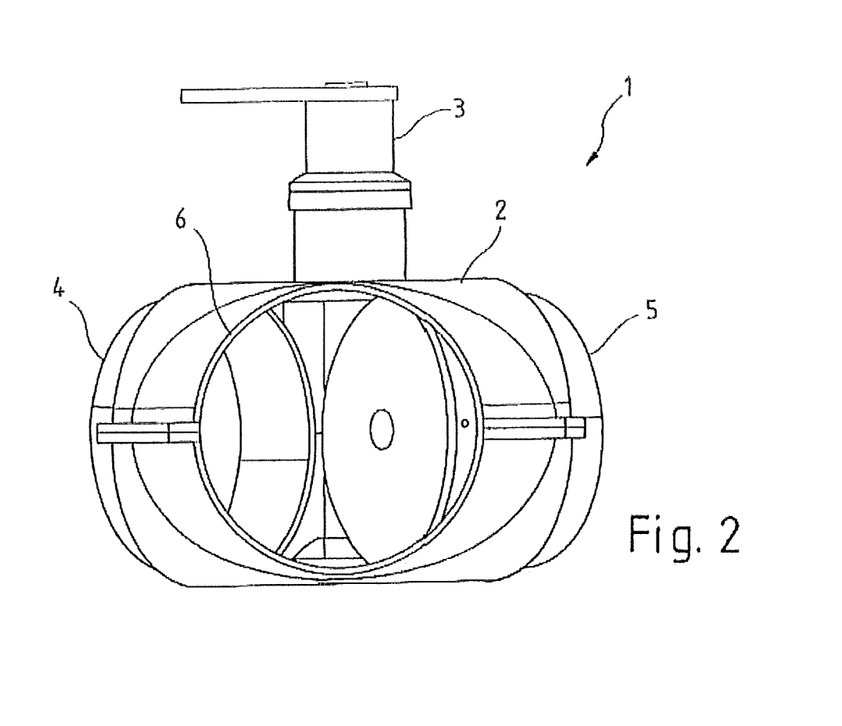
FIG. 2: a side view of a bypass valve.

FIG. 2 shows the bypass valve 1 illustrated in FIG. 1 from a side view, in which the viewer is looking into the interior of the valve housing 2 through the exhaust gas port 6. In this case, the actuating mechanism 3 is closing off the cooler port 5 by the means for directing the gas flow, so that the flow of fluid coming from the exhaust gas port 6 is directed to the bypass port 4.

Figure 3:
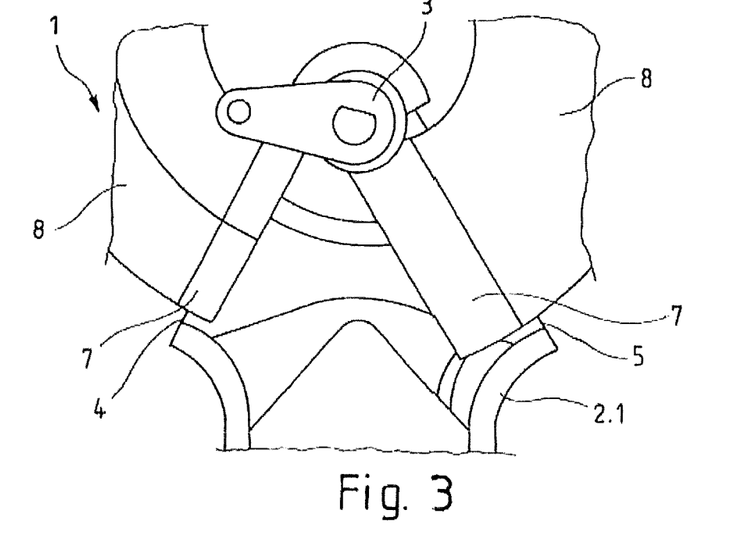
FIG. 3: a plan view of a partial representation of a bypass valve.
Figure 4:
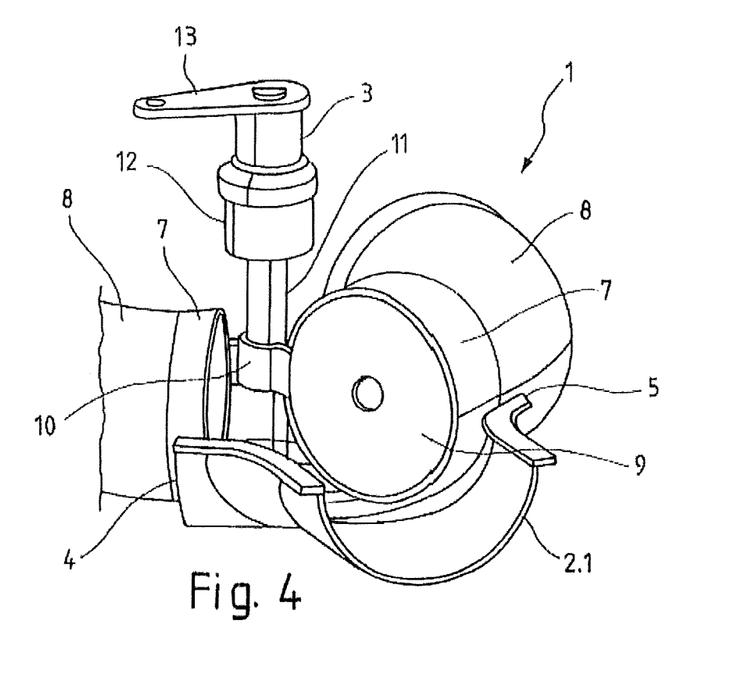
FIG. 4: a bypass valve with a single flap from a three-dimensional side view.

FIGS. 3 and 4 each show a partial representation of a bypass valve 1 in which the valve housing 2 is represented only by a lower valve housing half 2.1, to more clearly illustrate the structure and the functioning of the actuating mechanism 3.

At the bypass port 4 and cooler port 5, the adapter and sealing ring element 7 are connected to connecting tubes 8 as schematically illustrated. The actuating mechanism 3 comprises substantially an actuating lever 13 and a spindle 11, with a flap bracket 10 with a valve flap 9 being mounted at a lower end of the spindle 11. A spindle seal 12 seals a bearing of the spindle 11 against the exterior, with the spindle 11 being mounted movably in an upper housing half, not shown here. An adjusting movement exerted on the actuating lever 13 causes the spindle 11 to rotate, thereby moving the valve flap 9 by means of the flap bracket 10 toward the adapter and sealing ring element 7, against which said flap is placed or pressed forming a seal. The actuating mechanism 3 is mounted unsupported, based on the type, and fluid-tight by means of the spindle seal 12 on the upper housing half, which is not shown here.

The valve flap 9 is embodied as a single flap 9 which is moved by means of the rotating movement of the spindle 11 around the axis thereof, blocking one of the bypass port 4 or the cooler port 5. When the valve flap 9 is in a central position, both the bypass port 4 and the cooler port 5 can be opened up.

Figure 5:
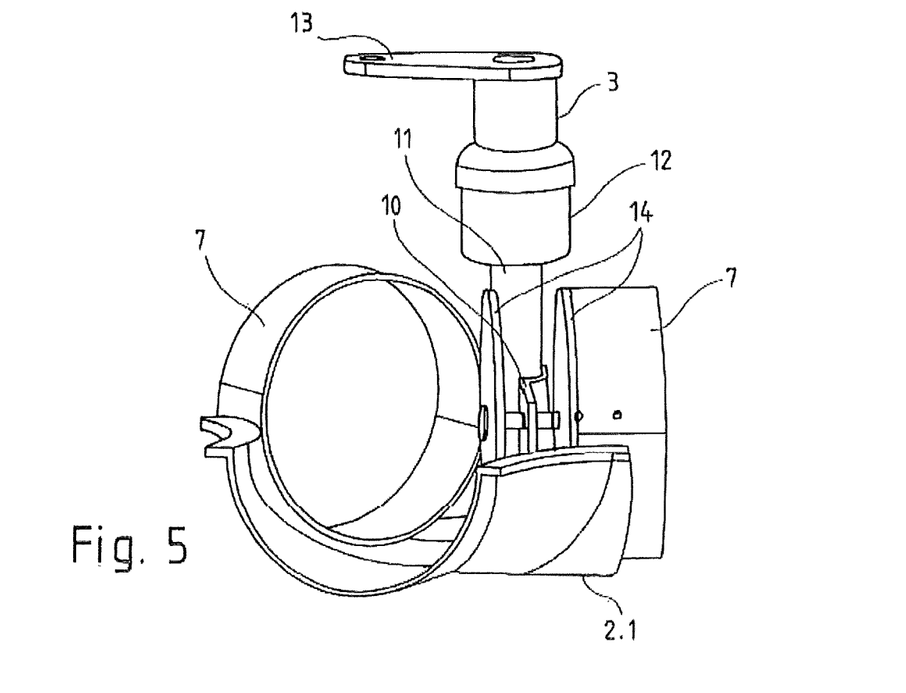
FIG. 5: a partial representation of a bypass valve with a double flap from a three-dimensional side view.
Figure 6:
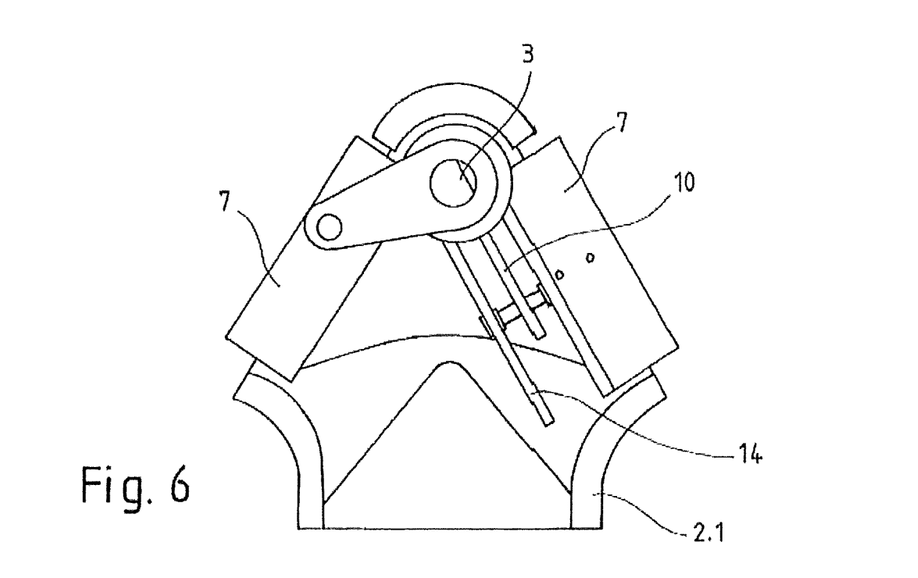
FIG. 6: a partial illustration of a bypass valve with a double flap from a plan view.

FIGS. 5 and 6 show the embodiment of the bypass valve 1 similar to the embodiment according to FIGS. 3 and 4 in the variant having a double flap 14 as the valve flap. Once again, the actuating mechanism 3 is formed from the actuating lever 13 and the spindle 11 with the flap bracket 10 and the double flap 14 mounted thereon. The double flap 14 implements its sealing effect in each case by means of a flap, which abuts the adapter and sealing ring element 7 of the respective port 4 or 5, forming a seal. In the partial representations of the side view and the plan view, in the interest of clarity, once again only the lower valve housing half 2.1 is shown.

Figure 7:
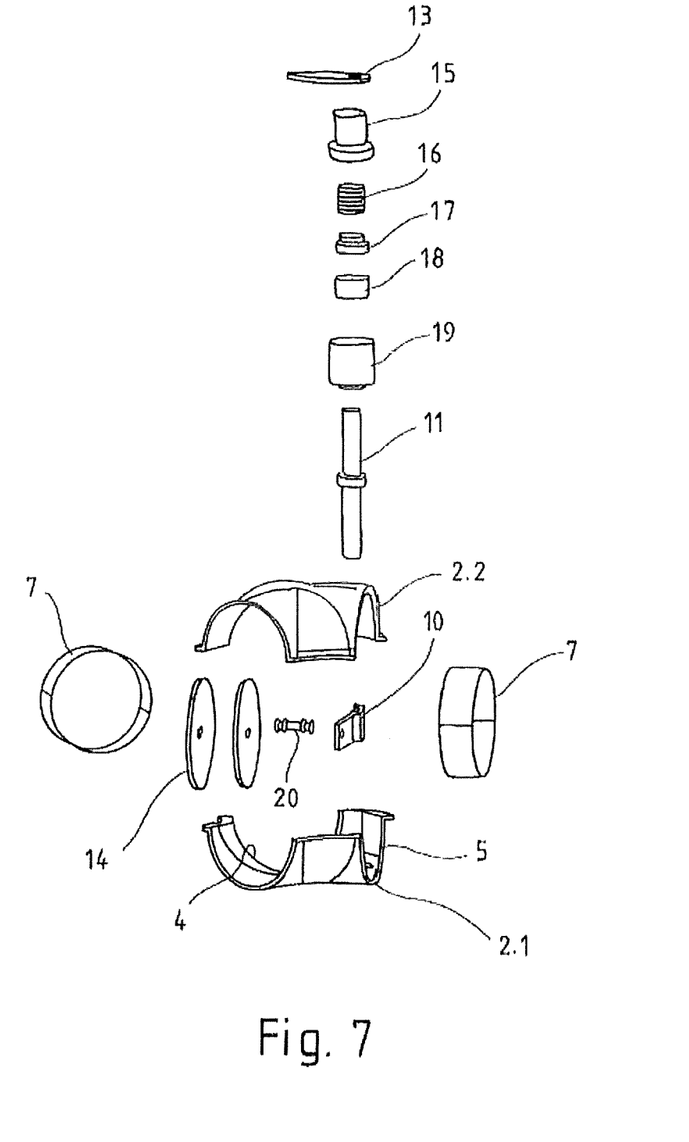
FIG. 7: an exploded representation of the bypass valve with actuating mechanism.

FIG. 7 shows an exploded representation of the variant of the bypass valve 1 with its individual components. The valve housing 2 is formed from a lower valve housing half 2.1 and an upper valve housing half 2.2, in which adapter and sealing ring elements 7 are installed at ports 4 and 5. The actuating mechanism is formed by the spindle 11, at the upper end of which the actuating lever 13 for the spindle 11 is arranged. The spindle 11 extends through the upper valve housing half 2.2 inside a bearing housing 19. With the bearing housing 19, a bearing 18 and a spring seat 17 with a spring 16 and a closing spring housing cover 15 produce a sealed and unsupported mounting of the actuating mechanism. The flap bracket 10 is situated at the lower end of the spindle 11, and holds a rivet 20 with the valve flaps 14 arranged spaced thereon.

The double flap 14 is formed by attaching an individual valve flap on each of the two sides of the rivet 20.

Figure 8:
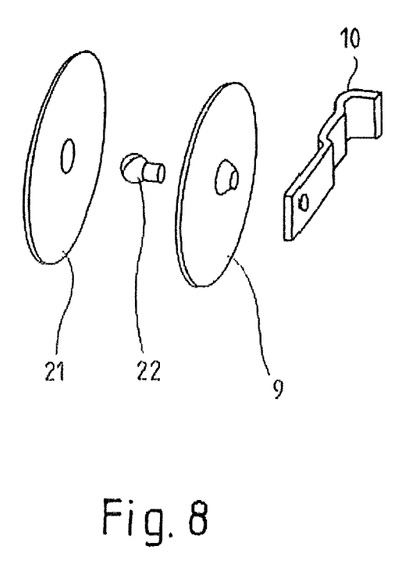
FIG. 8: a single flap with a tolerance compensating mount.

FIG. 8 shows the embodiment of a single flap 9, arranged on the flap bracket 10, and illustrates the special feature of the design of a bearing element 22 for a gimbal mounting of the single flap 9 and a cover flap 21 connected thereto. The gimbal mounting of the valve flap 9 as a single flap and of the double flap 14 as a double flap has proven highly advantageous for compensating for any play that may exist during sealing of the bypass port 4 and the cooler port 5 to be blocked together with the adapter and sealing ring element 7, thereby ensuring proper functioning of the bypass valve 1.

The cost of producing the bypass valve 1 is thereby further reduced in a particularly advantageous manner, and compensation for tolerances is accomplished by adapting the adapter and sealing ring element 7 and also by the gimbal mounting of the valve flap 9 or the double flap 14.

A gimbal mounting of the valve flap 9 and the double flap 14 is understood to mean that the valve flap 9 and the double flap 14 are able to move a small amount in relation to the flap bracket 10 so as to adjust their position on the adapter and sealing ring element 7 in order to compensate for tolerances during sealing.

Only with this gimbal mounting of the valve flap 9 and the double flap 14 can stamped sheet metal components be used for the upper and lower valve housing halves 2.1 and 2.2 in conjunction with the adapter and sealing ring elements 7, since this mounting allows the necessary tolerance compensation for tolerance values occurring during assembly to be ensured.

While certain representative embodiments and details have been shown for purposes of illustrating the invention, it will be apparent to those skilled in the art that various changes may be made without departing from the scope of the disclosure, which is further described in the following appended claims.

LIST OF REFERENCE SIGNS

1 Bypass valve, two-way valve
2 Valve housing
2.1 Lower valve housing half
2.2 Upper valve housing half
3 Actuating mechanism
4 Port, bypass port
5 Port, cooler port
6 Port, exhaust gas port
7 Adapter and sealing ring element
8 Connecting tube
9 Valve flap, single flap
10 Flap bracket
11 Spindle
12 Spindle seal
13 Actuating lever
14 Valve flap, double flap
15 Spring housing cover
16 Spring
17 Spring seat
18 Bearing
19 Bearing housing
20 Rivet
21 Cover flap
22 Bearing element

What is claimed is:

1. A bypass valve for exhaust gas flows from a motor vehicle, comprising:
a valve housing having an upper valve housing half and a lower valve housing half separately formed from each other, the upper valve housing half and the lower valve housing half cooperating to define at least two fluid outlet ports and an exhaust gas port configured for fluid intake, each of the at least two fluid outlet ports including an adapter and sealing ring element, wherein each of the upper valve housing half and the lower valve housing half is formed from sheet metal, each of the lower valve housing half and the upper valve housing half having three bent portions, each of the three bent portions of the lower valve housing half contacting one of the three bent portions of the upper valve housing half;
an actuating mechanism at least partially received in the valve housing; and
a valve flap operated by the actuating mechanism and alternately sealing the at least two fluid outlet ports, wherein a first one of the three bent portions of each of the lower valve housing half and the upper valve housing half is positioned intermediate and arcuately extends between the exhaust gas port and a first one of the at least two fluid outlet ports, a second one of the three bents portions of each of the lower valve housing half and the upper valve housing half is positioned intermediate and arcuately extends between the exhaust gas port and a second one of the at least two fluid outlet ports, and a third one of the three bent portions of each of the lower valve housing half and the upper valve housing half is at least partially enveloping the actuating mechanism and arcuately extending about the actuating mechanism between the first one of the at least two fluid outlet ports and the second one of the at least two fluid outlet ports, wherein the actuating mechanism includes a spindle having a first end and a second end, an actuating lever mounted on the first end of the spindle, a flap bracket mounted on the second end of the spindle and coupled to the valve flap, and a spindle seal sealing between the spindle and the upper valve housing.

2. The bypass valve of claim 1, wherein the valve flap includes one flap.

3. The bypass valve of claim 1, wherein the valve flap includes two flaps.

4. The bypass valve of claim 3, wherein the two flaps are arranged spaced apart on a rivet.

5. The bypass valve of claim 1, wherein the valve flap is configured to sealingly engage each of the adapter and sealing ring elements.

6. The bypass valve of claim 1, wherein the adapter and sealing ring element is a hollow cylinder projecting outwardly from the at least two fluid outlet ports.

7. The bypass valve of claim 1, wherein the adapter and sealing ring element is conformable to correspond to the valve flap.

8. The bypass valve of claim 1, wherein the adapter and sealing ring element is conformable to vary a flow cross-section of the at least two fluid outlet ports.

9. The bypass valve of claim 1, wherein the actuating mechanism is rotatable and at least partially mounted in the valve housing.

10. The bypass valve of claim 9, wherein the valve flap is pivotally coupled to the flap bracket by a bearing element to facilitate sealing of the at least two fluid outlet ports.

11. The bypass valve of claim 10, wherein the bearing element is configured as a gimbal mount coupling the valve flap to the flap bracket, wherein the bearing element provides a moving relationship between the valve flap and the adapter and sealing ring element.

12. The bypass valve of claim 1, wherein each of the adapter and sealing ring elements is coupled to a connecting tube.

13. The bypass valve of claim 1, wherein each of the lower valve housing half and the upper valve housing half is formed from stamped sheet metal.

14. A bypass valve for exhaust gas flows from a motor vehicle, comprising:
   a valve housing having an upper valve housing half and a lower valve housing half separately formed from each other, the upper valve housing half and the lower valve housing half cooperating to define at least two fluid outlet ports and an exhaust gas port configured for fluid intake, each of the at least two fluid outlet ports including an adapter and sealing ring element wherein each of the upper valve housing half and the lower valve housing half is formed from sheet metal, each of the lower valve housing half and the upper valve housing half having three bent portions, each of the three bent portions of the lower valve housing half contacting one of the three bent portions of the upper valve housing half;
   a pair of connecting tubes, each of the connecting tubes received by the adapter and sealing ring element;
   an actuating mechanism at least partially received in the valve housing and having a flap bracket pivotally coupled thereto; and
   a valve flap coupled to and pivoting with the flap bracket the valve flap operated by the actuating mechanism for alternately sealing the at least two fluid outlet ports, the valve flap configured to sealingly engage with each of the adapter and sealing ring elements, wherein a first one of the three bent portions of each of the lower valve housing half and the upper valve housing half is positioned intermediate and arcuately extending between the exhaust gas port and a first one of the at least two fluid outlet ports, a second one of the three bent portions of each of the lower valve housing half and the upper valve housing half is positioned intermediate and extending arcuately between the exhaust gas port and a second one of the at least two fluid outlet ports, and a third one of the three bent portions of each of the lower valve housing half and the upper valve housing half is at least partially enveloping the actuating mechanism and arcuately extending about the actuating mechanism between the first one of the at least two fluid outlet ports and the second one of the at least two fluid outlet ports, wherein the actuating mechanism includes a spindle having a first end and a second end, an actuating lever mounted on the first end of the spindle, the flap bracket mounted on the second end of the spindle and coupled to the valve flap, and a spindle seal sealing between the spindle and the upper valve housing.

15. The bypass valve of claim 14, wherein the valve flap includes one flap.

16. The bypass valve of claim 14, wherein the valve flap includes two flaps, wherein the two flaps are arranged spaced apart on a rivet.

17. The bypass valve of claim 14, wherein the adapter and sealing ring element is a hollow cylinder projecting outwardly from the at least two fluid outlet ports and is conformable to correspond to the valve flap.

18. The bypass valve of claim 14, wherein the actuating mechanism is rotatable and at least partially mounted in the valve housing.

* * * * *